United States Patent [19]

Mullins, Jr.

[11] 4,321,770

[45] Mar. 30, 1982

[54] METHOD AND APPARATUS FOR INSTALLING A SECURITY BAR ASSEMBLY AT A GUARDED AREA

[76] Inventor: John B. Mullins, Jr., 1412 N. Louise St., Santa Ana, Calif. 92706

[21] Appl. No.: 148,064

[22] Filed: May 12, 1980

[51] Int. Cl.³ .............................................. E06B 3/68
[52] U.S. Cl. ........................................ 49/50; 52/106; 285/31; 403/316
[58] Field of Search ......................... 49/50, 55, 57, 61; 52/106; 285/91, 383, 403, 404, 31; 403/315, 316, 319

[56] References Cited

U.S. PATENT DOCUMENTS

| | | | |
|---|---|---|---|
| 1,662,117 | 3/1928 | Kuhl | 49/55 X |
| 1,734,415 | 11/1929 | Bierfield | 49/55 X |
| 2,459,884 | 1/1949 | Kopf | 49/57 X |
| 2,982,579 | 5/1961 | Greenwald | 49/55 X |
| 3,460,289 | 8/1969 | Toth | 49/50 |
| 3,829,136 | 8/1974 | Eidelberg | 285/383 |
| 3,932,899 | 1/1976 | Brady et al. | 52/106 X |
| 3,942,576 | 3/1976 | Rickard | 49/55 X |

*Primary Examiner*—Philip C. Kannan
*Attorney, Agent, or Firm*—Fischer, Tachner & Strauss

[57] ABSTRACT

An inexpensive and reliable security bar that may be easily and quickly assembled between structural supports of a guarded area to prevent entry into the area. The present security bar comprises first and second elongated bar members, one end of each of which is respectively installed into a structural support. The security bar members are substantially aligned with one another across the entrance to the guarded area, so that a small gap is formed between the second ends thereof. A hollow coupling sleeve is positioned over the gap, and a dowel or pin is inserted through a hole in the sleeve and into the gap between the bar members. Accordingly, when in the assembled relationship, the sleeve and pin cooperate to inhibit the lateral and angular displacement of the bar members, whereby to prevent removal of the security bar from the guarded area after installation between the structural supports thereof.

8 Claims, 4 Drawing Figures

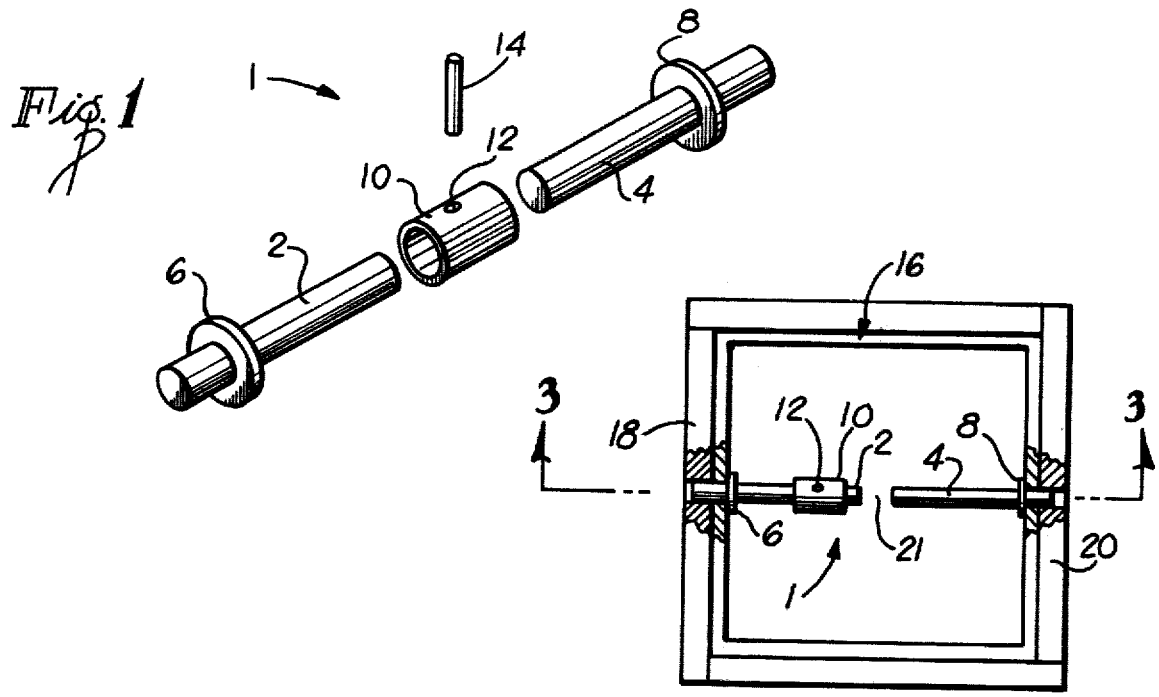
Fig. 1
Fig. 2
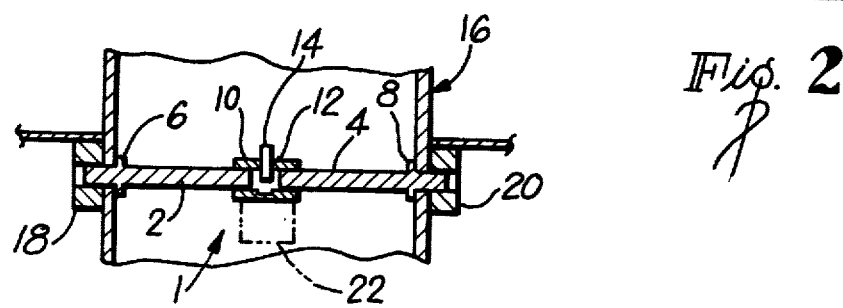
Fig. 3
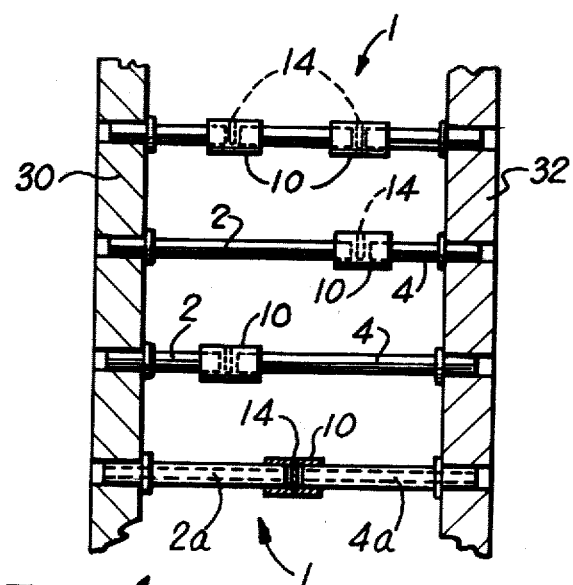
Fig. 4

METHOD AND APPARATUS FOR INSTALLING A SECURITY BAR ASSEMBLY AT A GUARDED AREA

BACKGROUND OF THE INVENTION

1. Field of the Invention

This invention relates to an inexpensive, permanent security bar assembly and to a method for installing the security bar, whereby to prevent unauthorized entry into certain guarded areas. Moreover, this invention also relates to an improved means by which to easily form interconnections between a pair of closely spaced structural support members (such as to form a ladder, interconnections for conduit runs, or the like).

2. Prior Art

It often is desirable to have available a reliable assembly and a technique by which to easily install the assembly in order to block entry to a guarded area. By way of example, certain local laws require that when a fluid duct (e.g. such as that used in an air conditioning system) extends through the roof of a structure, means must also be provided to prevent burglars from entering the duct at the exterior, whereby to unlawfully gain access to the interior of the structure. Other applications for which it may be desirable to guard against an unauthorized entry include windows, sky lights, and machinery inspection stations.

However, few efficient security bars are known which are adapted to be reliably interfaced with an area to be guarded in order to block entry thereto by a burglar or other unauthorized personnel. Moreover, conventional security bars (of unitary construction) are not adapted to be assembled across an area having a variety of dimensions. What is more, the conventional security bar must be typically assembled and installed from a location exterior to the area being guarded. Such installation may be both difficult and hazardous, in the event that the exterior of the guarded area is either in an inaccessible or unsafe location. What is still more, the utilization of conventional security bars is limited as a consequence of the relatively high cost of fabrication and the complex or time consuming technique by which the bar is typically installed. Hence, the flexibility of conventional security bar assemblies is greatly limited.

Examples of conventional security bar arrangements may be found in the following U.S. Pat. Nos.: 1,662,117 Mar. 13, 1928; 3,932,899 Jan. 20, 1976.

SUMMARY OF THE INVENTION

Briefly, and in general terms, an inexpensive security bar assembly is disclosed having a structure that permits the security bar to be reliably installed between structural supports associated with an area to be guarded against unauthorized entry. The instant security bar assembly is installed according to a relatively efficient and rapid method, whereby to overcome problems inherent in conventional security bar assemblies. The instant security bar comprises at least two elongated members and a hollow coupling sleeve for interconnecting the members between first and second structural supports of the area to be guarded. One end of a first of the security bar members is inserted into an opening formed in a first structural support. A stop portion may be formed on each of the security bar members, so that the stop portion of the first bar member is positioned immediately adjacent the first structural support of the guarded area. The hollow coupling sleeve is slid over the other end of the first bar member. One end of the second security bar member is inserted into an opening formed in the second structural support, so that the respective stop portion thereof is positioned immediately adjacent the second structural support of the guarded area. The sizes of the first and second security bar members are chosen so that a small gap is formed between the first and second bar members when said members are aligned with one another between the structural supports. Next, the coupling sleeve is positioned over the gap between the security bar members. A suitable pin or dowel is then fit through an opening formed in the coupling sleeve and into the gap between the bar members. The interaction of the respective stop portions, the hollow coupling sleeve, and the pin cooperate to inhibit both the lateral and angular displacement of the security bar members, whereby to prevent the removal of the present security bar after installation between the structural supports of the guarded area.

BRIEF DESCRIPTION OF THE DRAWINGS

FIG. 1 shows an exploded view of the security bar assembly that forms the present invention.

FIG. 2 is illustrative of part of the method by which the security bar assembly of FIG. 1 is reliably and easily installed at an air duct to prevent entry into said duct.

FIG. 3 is a section taken along the lines 3—3 of FIG. 2 to illustrate another part of the method by which the present security bar assembly is reliably and easily installed at the air duct.

FIG. 4 represents various modifications of the preferred security bar assembly of FIG. 1.

DESCRIPTION OF THE PREFERRED EMBODIMENT

Referring to the drawings, FIG. 1 shows an exploded view of the security bar 1 of the present invention that may be easily installed to prevent unauthorized access to a guarded area. The security bar 1 comprises first and second bar members 2 and 4. Each bar member 2 and 4 is preferably a cylindrically shaped solid (i.e. rod) that is typically fabricated from a high strength material, such as steel, or the like. A stop portion 6 and 8 is respectively formed at a first end of each of the bar members 2 and 4. By way of example, the stop portions 6 and 8 may comprise a ridge or raised lip that is formed (e.g. welded) around each of the bar members 2 and 4. The stops 6 and 8 are sized to form a suitable means of interfacing the assembled security bar 1 with an appropriate supporting structure of the area to be made secure from unauthorized entry.

A hollow, cylindrically shaped sleeve or coupler 10 is adapted to receive therein some of the second ends of each of the bar members 2 and 4. The sleeve 10 is typically formed from the same material (e.g. steel) that forms bar members 2 and 4. A hole 12 is punched or drilled through one side of the cylindrical sleeve 10. The hole 12 is sized so as to be suitable to receive therein a conventional (hardened steel) pin or dowel 14. As will be explained in greater detail hereinafter, in the assembled relationship, pin 14 is inserted through hole 12 of sleeve 10 and between the second ends of bar members 2 and 4, whereby the combination of pin 14 and the stop portions 6 and 8 cooperate to substantially limit the lateral displacement of the security bar 1 after installation at the supporting structure of the area to be guarded.

In a preferred embodiment of the invention and referring concurrently to FIGS. 2 and 3 of the drawings, the security bar 1 of FIG. 1 can be easily and reliably interconnected with the structural support of an air conveying (conditioning) system, whereby to prevent an individual from gaining access to the system and, eventually, to the interior of a building with which the system is associated. Typically, an air conveying system includes a fluid duct 16 for transmitting air into, through, or out of the building. As is common to such systems, the duct 16 is connected to and retained by a header or similar supporting means.

The method by which the instant security bar 1 is permanently assembled across the air duct 16 so as to prevent unauthorized entry therein is disclosed as follows. Suitable holes are punched or drilled through both the duct 16 and the opposite walls 18 and 20 of the supporting header. Each hole is sized to receive therein a respective first end of bar members 2 and 4. As is best shown in FIG. 2, the first end of one of the bar members (e.g. 2) is inserted into its respective hole in duct 16 and header wall 18. The hollow sleeve 10 is slid over the second end of bar member 2. The first end of the other bar member 4 is then inserted into its corresponding hole in duct 16 and header wall 20. In a preferred relationship, the bar members 2 and 4 are substantially aligned with one another, and the stop portions 6 and 8 thereof are positioned immediately adjacent header walls 18 and 20, respectively.

As is best shown in FIG. 3, the sleeve 10 is positioned over each of the second ends of bar members 2 and 4, so that the hole 12 formed in the sleeve 10 is aligned with a small gap 21 between the second ends of bar members 2 and 4. Therefore, the combined length of the second ends of bar members 2 and 4 must be slightly less than the distance across the area of duct 16 which is to be made secure from unauthorized entry. In the assembled relationship, the sleeve 10 inhibits the angular movement and removal of either of bar members 2 and 4. Lastly, the pin 14 is pressed through the hole 12 in sleeve 10 until it is aligned flush with the outer surface of the sleeve. By way of example, a dolly or conventional backing plate 22 is positioned on the undersurface of sleeve 10, opposite the location of hole 12. The pin 14 is driven between bar members 2 and 4 by means of a hammer, or the like, to fit snugly in and prevent removal from hole 12.

As will be apparent to those skilled in the art, inasmuch as the present security bar 1 comprises a plurality of pieces, rather than a single, elongated piece, as is common to the prior art, the instant bar 1 may be advantageously installed across the air duct 16 by a workman who is located either inside or outside the duct. This is especially advantageous when the duct 16 which is to be protected is substantially inaccessible from a position exterior to the building in which it is utilized. The parts that comprise the instant security bar 1 are relatively easy to assemble and inexpensive to fabricate, whereby a security grid (comprising any number of a plurality of security bars) may be reliably connected across an area to be protected in a relatively short amount of time. Moreover, the combined interaction of stops 6 and 8 (against the opposing header walls 18 and 20), sleeve 10, and the dowel pin 14 (interpositioned between the second ends of bar members 2 and 4) cooperate to limit the lateral displacement between walls 6 and 8, whereby to prevent the removal of the security bar by one seeking to gain access to the guarded area. Thus, by fabricating the hollow sleeve 10 with a suitable length, a security bar 1 that is formed in accordance with the present invention may be permanently connected across any one of a plurality of different ducts having a variety of dimensions. What is more, the present security bar installation provides a reliable means for preventing unauthorized access into a guarded area without the necessity of either threading and screw-fitting the parts thereof or welding certain parts of the security bar (e.g. such as stops 6 and 8) to any of the supporting structure 16, 18, or 20, as is otherwise typically required during the assembly of prior art security bar arrangements. Thus, a workman requires no special tools or skills in order to reliably and quickly install the instant security bar 1.

Although only one of the disclosed security bars 1 is illustrated in FIGS. 2 and 3 of the drawings, it is to be understood that this is for purposes of convenience only. Therefore, and as best illustrated in FIG. 4, any suitable number of the disclosed bars 1 may be easily installed across the duct 16, depending upon the size and location of the duct.

In the preferred embodiment of the invention, the instant security bar 1 has been disclosed having particular application for preventing unauthorized access to a guarded area (e.g. such as the interior of an air conditioning duct). However, it is to be understood that the present security bar may be conveniently assembled for connection between any suitable structural supports or frame members. By way of example, FIG. 4 of the drawings is representative of such additional applications of the instant security bar 1. It may be desirable to form a permanent ladder in the field to enable a workman to climb up or across a building, a tower, or the like. Therefore, opposing parallel support means 30 and 32 may comprise any of columns, trusses, beams, or girders of an existing structure, which support means are positioned relatively close to one another, whereby to permit a desirable number of the present security bars 1 to be connected therebetween. It is also contemplated herein to utilize the hollow sleeve 10 and pin 14 to rapidly couple together sections (designated 2a and 4a) of hollow conduit that convey runs of electrical wires across a duct or other opening. Yet another application of the present security bar arrangement is to prevent unauthorized entry (e.g. by a burglar, or the like) into a household. Accordingly, support means 30 and 32 of FIG. 4 may alternatively comprise parallel members that form the frame of a window or a skyway. Therefore, regardless of the type of support means 30 and 32 between which the present security bar 1 is to be connected, a sturdy and reliable installation may be quickly and inexpensively effected from either inside or outside of the area to be permanently protected.

It will be apparent that while a preferred embodiment of the invention has been shown and described, various modifications and changes may be made without departing from the true scope and spirit of the invention. For example, as is illustrated in FIG. 4, the lengths of the bar members 2 and 4 that are assembled to form the instant security bar 1 may be either identical to or different from one another. Moreover, it may be desirable to assemble a security bar comprising several bar members and hollow coupling sleeves. Hence, by virtue of the present invention, a low cost but reliable security bar assembly of increased flexibility is available, because only a relatively few different bar member sizes are needed to suitably protect a guarded area having a wide variety of different dimensions.

Although a preferred embodiment of the invention has been disclosed in detail sufficient to enable one skilled in the art to make and use the invention, it will now be understood in view of applicant's teaching herein, that variations in materials, dimensions and geometry are contemplated as being within the scope of the present invention, which is limited only by the appended claims.

I claim:

1. In combination with first and second structural members, a reliable and non-removable means extending between said structural members for preventing passage between said members, said preventing means comprising:
   at least first and second elongated members, one end of each of said elongated members respectively received by openings formed in said first and second structural members,
   coupling means to receive therein and to permanently interconnect the second ends of each of said elongated members, said coupling means having an opening formed through one side thereof, and
   retaining pin means, said pin means inserted through the opening in said coupling means and in permanent receipt between the second ends of said first and second elongated members, whereby to inhibit lateral displacement and removal of said elongated members when said passage preventing means is installed in the assembled relationship between said structural members.

2. The combination recited in claim 1, wherein said first and second elongated members comprise hollow cylindrical rods.

3. The combination recited in claim 1, wherein said first and second elongated members comprise solid bars.

4. The combination recited in claim 1, wherein each of said first and second elongated members has a stop portion thereon,
   said stop portions being positioned immediately adjacent said structural members when said elongated members are received by the openings therein, whereby to further inhibit the lateral displacement of said elongated members between said structural members.

5. The combination recited in claim 1, wherein said coupling means comprises a hollow cylinder.

6. The combination recited in claim 1, wherein the sum of the lengths of the second ends of said elongated members is less than the distance between said structural members, so that a gap is formed between said second ends, said retaining pin means being inserted into the gap therebetween.

7. A method for permanently assembling a non-removable security bar comprising a plurality of sections and a hollow coupling means between first and second structural members for preventing passage between said structural members, said method including the steps of:
   inserting one end of a first security bar section into an opening formed in the first structural member,
   sliding the hollow coupling means over the other end of the first bar section,
   inserting one end of a second security bar section into an opening formed in the second structural member and substantially aligning said first and second security bar sections with one another between said structural members, so that a gap is formed between said first and second bar sections,
   positioning said coupling means over said gap, and
   fitting a pin through an opening in said coupling means and into permanent receipt within said gap between said bar sections, whereby to inhibit lateral displacement and removal of said security bar sections when said security bar is assembled between said structural members.

8. The method recited in claim 7, including the additional steps of forming stop means on each of said first and second security bar sections and respectively positioning said stop means immediately adjacent said first and second structural members when said bar sections are received by the openings therein, whereby to further inhibit the lateral displacement of said security bar sections between said structural members.

* * * * *